Jan. 5, 1943.  D. L. BUTOW  2,307,357
SIGNAL CONTROL
Filed Oct. 9, 1939  3 Sheets-Sheet 1
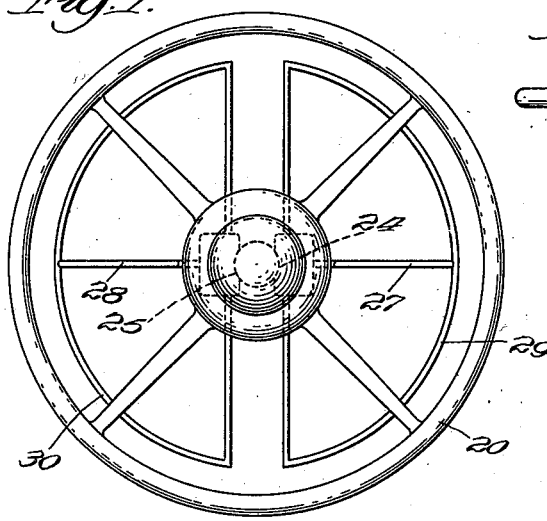
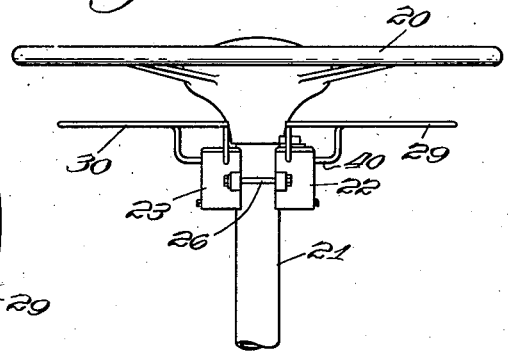
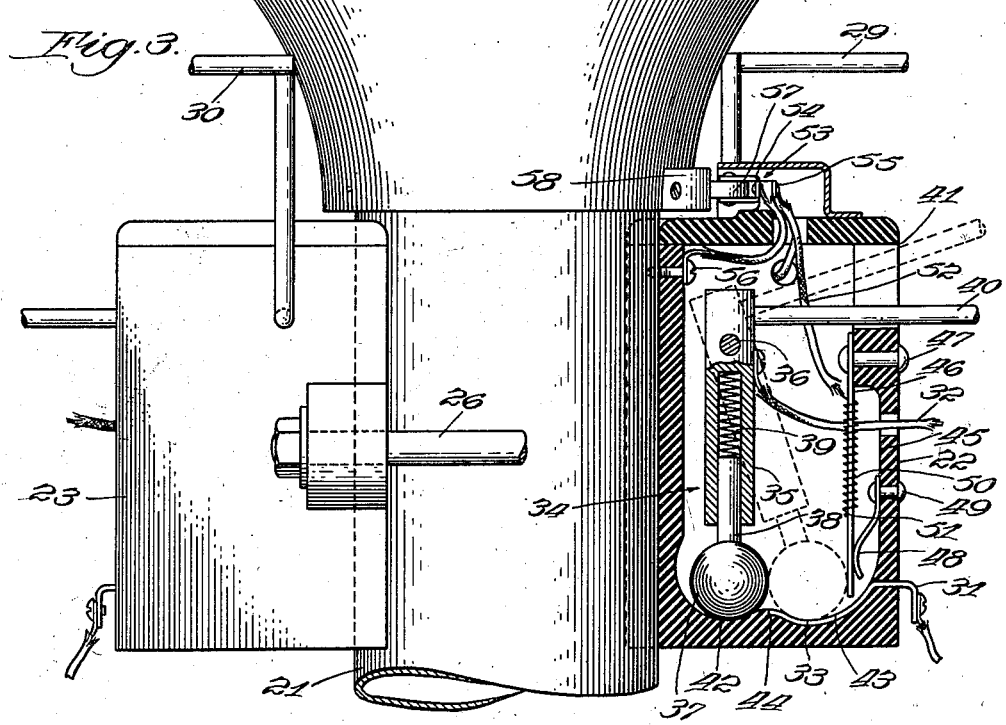
Inventor:
Douglas L. Butow.
By Chritton, Wiles, Davies, Hirschl & Dawson.
Attys.

Jan. 5, 1943.                    D. L. BUTOW                    2,307,357
                               SIGNAL CONTROL
                            Filed Oct. 9, 1939                 3 Sheets-Sheet 2
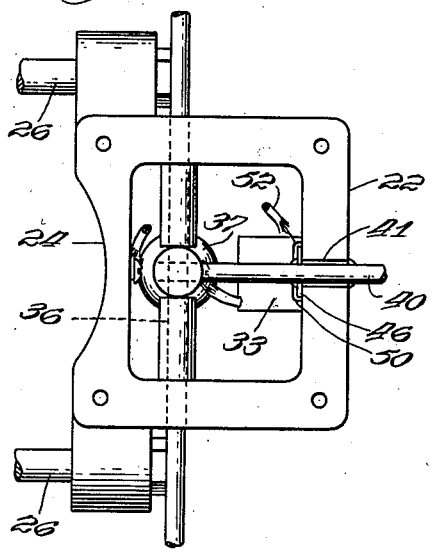
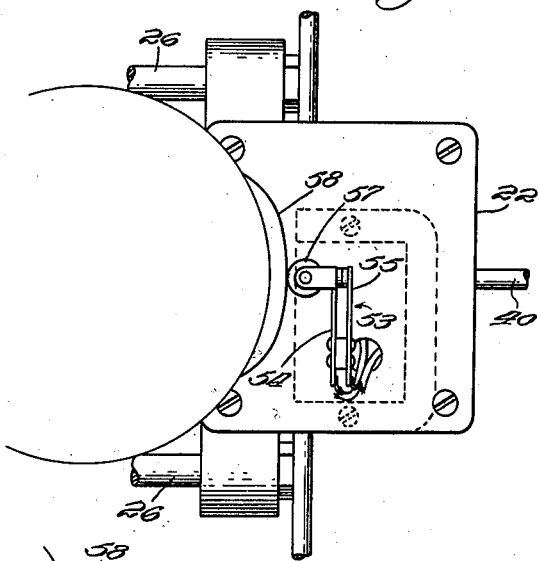
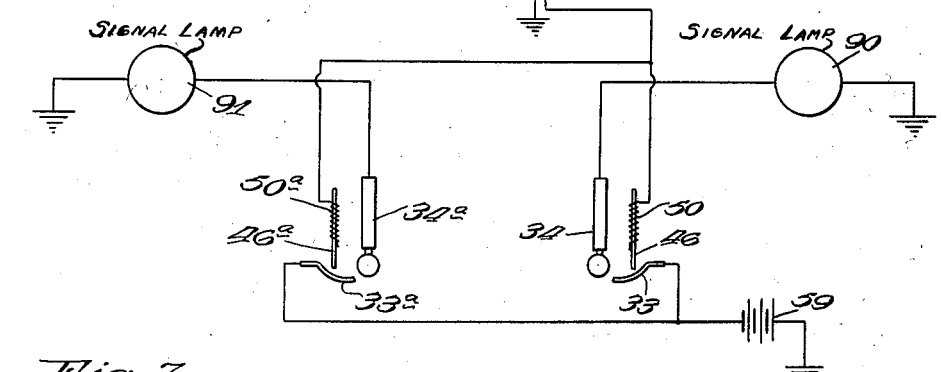
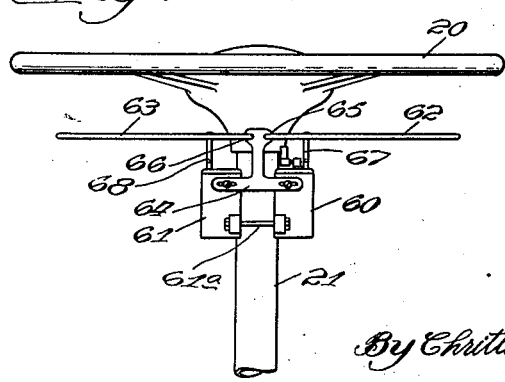
Inventor:
Douglas L. Butow.
By Chritton, Wiles, Davies, Hirsch & Dawson.
Attys.

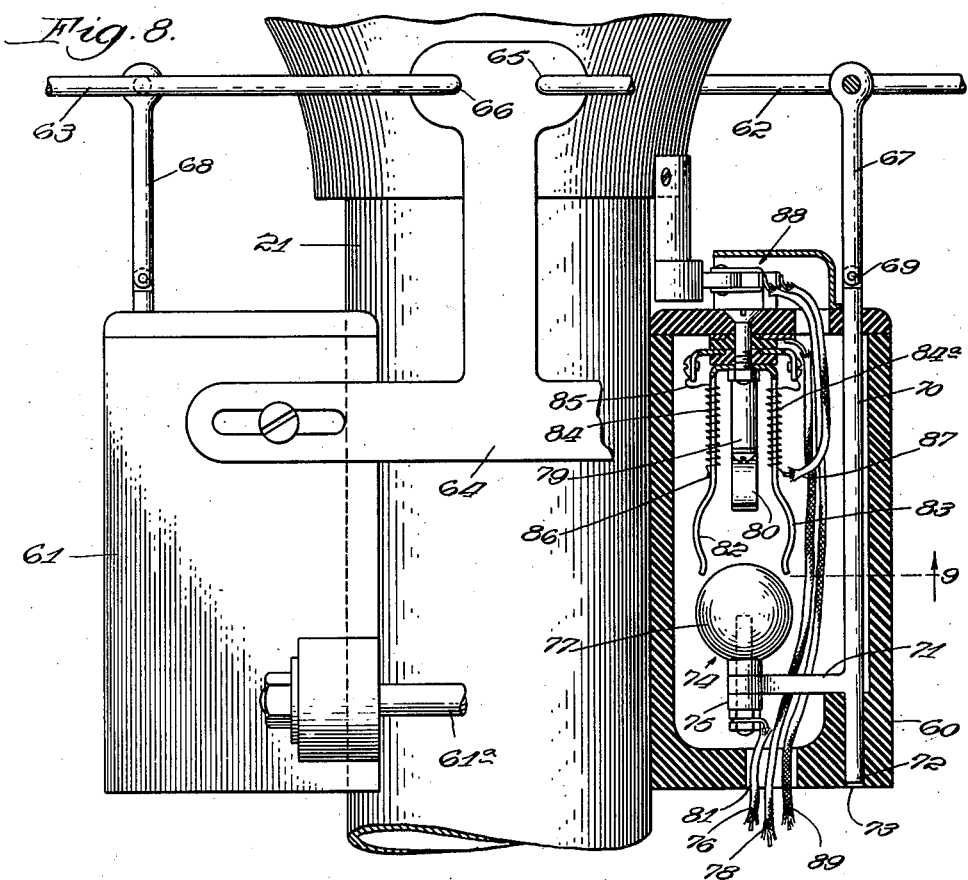
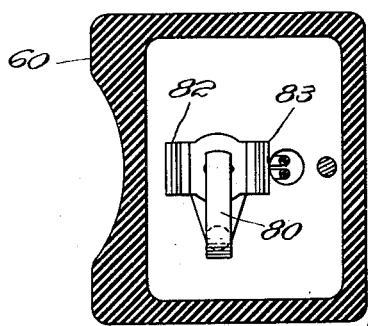
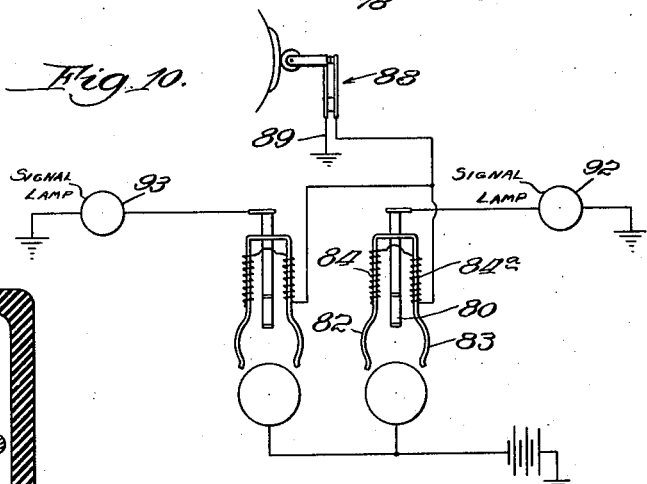

Patented Jan. 5, 1943

2,307,357

UNITED STATES PATENT OFFICE 2,307,357

SIGNAL CONTROL

Douglas L. Butow, Evanston, Ill.

Application October 9, 1939, Serial No. 298,680

3 Claims. (Cl. 177—339)

This invention relates to a signal control, and more particularly to a device for controlling the operation of automobile signal lamps, indicating a contemplated direction of turn of the automobile.

An object of this invention is to provide a signal control means arranged on the steering mechanism of an automobile and operated manually to close the circuit of the lamps. Another object is to provide a device which will automatically open the circuit of the lamps after a predetermined time of operation. Still another object is to provide a device in which the circuit remains closed without continuous manual engagement of the switch. Yet another object is to provide an auxiliary circuit for regulating and controlling the opening of the main circuit. A further object is to provide a device in which the lamp circuit remains closed, once a turn of the automobile is begun, until after the turn is completed. Other features and advantages will be apparent from the following specification and drawings, in which—

Fig. 1 is a plan view of the steering mechanism of the automobile, with the control device attached; Fig. 2 is a side elevational view of the same parts; Fig. 3 is a detail view, partly in section and partly in elevation, of the signal device attached to the steering mechanism; Fig. 4 is a plan view of the control device with the cover removed therefrom; Fig. 5 is a plan view of the control device showing the auxiliary switch; Fig. 6 is a circuit diagram of the preferred form of my invention; Fig. 7 is a side elevational view of a modification of my invention; Fig. 8 is a detail view, partly in elevation and partly in section, of the modified control device; Fig. 9 is a sectional view taken along the line 9 of Fig. 8; and Fig. 10 is a circuit diagram of the modification.

In the preferred form of my invention, as described herein, a steering wheel 20 and steering post 21 of an automobile provide a mounting for the casings 22 and 23 of the control device. These casings are curved at points 24 and 25, respectively, to fit snugly about the steering post, and are secured to each other by the bolts 26. Arms 27 and 28, pivotally mounted on the casings 22 and 23, carry arcuate members 29 and 30, which preferably extend along the periphery of the steering wheel 20.

These arcuate members 29 and 30 may be in the form of semi-circular rings, and are mounted adjacent the steering wheel 20, preferably beneath the wheel and within the circumference of the same. Because of the pivotal mounting of the arms 27 and 28, the arcuate members 29 and 30 are movable in a plane transverse to the plane of the steering wheel.

Referring particularly to Fig. 3, the casing 22 is provided with electrical connections 31 and 32, the connection 31 leading to the battery of the automobile, and the connection 32 leading to the signal lamp. To the connection 31 is secured a contact segment 33 mounted in the bottom of the casing 22. A contact member 34 is provided with a sleeve 35, which is pivotally mounted on the transverse rod 36. A contact ball 37 is secured to a shaft 38 which is slidably received within the sleeve 35. A spring 39 continuously urges the ball 37 into yielding engagement of the bottom of the casing 22.

Since the ball 37 is used merely to provide contact between the two electrical connections 31 and 32, it is obvious that many different shapes and forms of the same could be used. For example, a roller or similar contact surface could be attached to the shaft 38.

Above the pivotal mounting at 36 the contact member 34 is attached to a dependent extension 40 of the arm 27. In this manner, vertical movement of the ring 29 and arm 27 produces lateral movement of the contact member 34 and ball 37, as indicated in dotted lines in Fig. 3.

The casing 22 is provided with a side opening 41 and with recesses 42 and 43 in the bottom of the casing. A ridge or raised portion 44 projects upwardly between the recesses 42 and 43, permitting the ball 37 to be moved from one recess to the other only when sufficient lateral pressure is exerted upon the ball to cause the spring 39 to be compressed. The opening 41 permits movement of the dependent extension 40 of the arm 27.

The casing 22 may be cut away at 45 to permit movement of a bimetal strip 46 of suitable size and thickness secured to the casing by the rivet 47. A spring clip 48, riveted to the casing at 49, yieldingly engages the bimetal strip 46. The bimetal strip is so arranged that the lower portion thereof will engage the ball 37 when the same is moved into the recess 43. Upon heating, the bimetal strip 46 will bend or curl towards the ball 37 and urge the same from the recess 43. For the purpose of heating the bimetal strip, any means which is actuated by the closing of the electrical circuit of the switch may be provided.

A resistance element 50, preferably composed of a high resistance wire, may be wound in the form of a coil around the bimetal strip 46 for the purpose of heating the same and secured thereto at 51. The remainder of the coil 50 is insulated by lacquer or other suitable means from the bimetal strip 46. To the other end of the coil 50 is secured an electrical connection 52 to a second switch 53.

As seen particularly in Fig. 5, the switch 53 includes a pair of contacts 54 and 55, the contact 54 being grounded at 56 (Fig. 3) and the contact 55 being joined to the connection 52. The contact 54 is further provided with a roller 57 or other means for engaging the cam surface 58 on the rotatable portion of the steering post.

Fig. 6 shows a circuit diagram of the preferred embodiment of my control device. The battery 59 of the automobile is connected to the two contact segments 33 and 33a. When the switches are closed, the current flows through the two contact members 34 and 34a to the lamps 90 and 91 to light the same. At the same time the current flows from the segments 33 and 33a to the bimetal strips 46 and 46a and through the coils 50 and 50a to the switch 53.

By moving the rings 29 and 30 upwardly, the arms 27 and 28 are moved, and through the dependent extension 40 the contact member 34 is shifted to the position shown in dotted lines in Fig. 3, in which the ball is received within the recess 43. This closes the circuit of the lamp 90 and also the circuit including the resistance element 50. The lamp is illuminated, indicating the appropriate turn of the automobile which is contemplated.

The passage of the current through the coil 50 causes the bimetal strip 46 to be heated after a predetermined length of time. By adjusting the amount of resistance of the coil 50, this time may be varied as desired. The heating of the bimetal strip 46 causes it to bend towards the contact member 34 and urges the ball from the recess 43. When the ball reaches the ridge or raised portion in the bottom of the casing 22, the spring 39 urges it quickly into the recess 42, thus quickly breaking the contact. In the same manner, the spring 39 acts to urge the ball into the recess 43 when the circuit is being closed. The spring 48 aids the bimetal strip in urging the ball 37 from the recess 43.

The switch 53 is normally closed, since the cam 58 holds the contact 54 in engagement with the contact 55. However, when the steering wheel is turned, the cam 58 moves from engagement with the roller 57, permitting the contact 54 to move laterally away from the contact 55, opening the circuit of the resistance element 50. While the wheel is turned and this auxiliary circuit is open, the resistance element 50 will not be heated, and the contact member will remain in engagement with the segment 33.

The movement of the steering wheel to its original position will close the switch 53 and permit the heating of the resistance element 50 to continue. Thus, when the automobile wheels are turned, the heating of the resistance element will be stopped, and the signal lamp will remain on until a predetermined time after the turn is completed and the wheels returned to their original position. This feature is extremely useful when the automobile is operated in heavy traffic, since on many occasions it is necessary to a driver to stop after reaching a corner and partially turning the wheels. By means of this feature of construction, the signal lamp is caused to remain in operation until after the turn is completed, even though the stop may be for a considerable period of time.

A modification of my invention is shown in Figs. 7 to 10. In this modification, the steering wheel 20 and steering post 21 of the automobile support casings 60 and 61 of the control device, the two casings being joined by the bolt 61a. Arms 62 and 63 are joined to a base member 64, being pivotally attached thereto at 65 and 66. The base member 64 is secured to the casings 60 and 61. To the arms 62 and 63 are pivotally attached dependent arms 67 and 68.

A dependent extension 70 is pivotally joined to the arm 67 by the pivot 69. From this extension 70 a lateral projection 71 extends into the casing. The lower end of the extension 70 serves as a guide 72, moving within the recess 73 and casing 60. The projection 71 carries a contact member 74 secured thereto but insulated from the projection by the bushing 75.

An electrical connection 76 from the battery of the automobile is joined to the contact member 74 in any suitable manner. If desired, a spring connection may be used in order to avoid movement of the wire connection. The contact member 74 is provided with a ball 77, which may be raised and lowered by movement of the arm 67 and extension 70. A connection 78 joins the signal lamp to the pin 79 and the spring contact strip 80, the connection passing into the casing through the opening 81.

A pair of bimetal strips 82 and 83 are provided with resistance element coils 84 and 84a joined together by the connection 85. The coil 84 is attached to the bimetal strip 82 at 86. The end of the coil 84a joins a connection 87 to the auxiliary switch 88 similar in character to the switch 53 described in connection with the preferred embodiment. The switch 88 is grounded by the wire 89.

Although a pair of bimetal strips are shown and described, it is apparent that any suitable and convenient member may be used. Thus either a single strip or a large number of strips may be provided for this purpose.

The operation of the modification of my invention is similar to that of the preferred embodiment. The arms 62 and 63 are connected to rings such as the rings 29 and 30 shown in Fig. 1. When the ring 29 is moved upwardly, the movement of the dependent arm 67 and extension 70 causes the ball 77 to be brought into engagement with the spring contact 80, closing the circuit to the signal lamp 92. At the same time the bimetal strips 82 and 83 grip the ball 77, retaining it in such position of engagement.

The contact of the bimetal strips with the ball 77 permits current to flow through the strips, the coils 84 and 84a, and the switch 88. The passage of the current through the coils 84 and 84a heats the coils and the bimetal strips which they engage. When the bimetal strips are heated, they bend outwardly away from the ball 77, permitting the ball to move downwardly out of engagement with the spring contact 80, thus breaking the circuit of the lamp 92. The operation of the switch 88 is the same as that of the switch 53 in the preferred embodiment.

The mechanism within the casing 61 operates in the same manner as that within the casing 60, to light the signal lamp 93.

This modified form of my invention permits the manual operation of the rings adjacent the steering wheel to close the circuit and light the appropriate signal lamp. At the same time an automatic breaking or opening of the circuit is provided for a predetermined time after the closing of the circuit.

Both forms of my invention may be used to operate signal lamps for any desired purpose. My invention is, of course, particularly adapted for use with automobile signal lamps by which the driver of the automobile can indicate a contemplated turn. However, it may also be used for the operation of an automobile stop light by which an intention to stop may be indicated before the brakes are applied or the actual slowing down begun.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. In a device of the character described for controlling the operation of automobile signal lamps, a lamp circuit, a second electrical circuit, said second circuit having a common portion with said lamp circuit, a switch for opening and closing both of said circuits, said switch being arranged to act simultaneously in both circuits, manually operable means for actuating said switch to close said circuits, bimetal means for actuating said switch to open said circuits, an electrical resistance heating element in said second circuit for actuating said bimetal means a predetermined time after the closing of said circuits, said element being heated by the flow of current through said second circuit, a switch in said second circuit only, for opening and closing said second circuit independently of the lamp circuit whereby the said element is heated only when the switch is closed, and means associated with the steering wheel of the automobile for controlling the opening and closing of said last-mentioned switch, said switch being open when the wheels of the automobile are turned to either side and being closed by the return of the wheels to forwardly aligned position.

2. In a device of the character described for controlling the operation of automobile signal lamps, a lamp circuit, a second electrical circuit, switch means for opening and closing both of said circuits, said switch means being arranged to act simultaneously in both circuits, manually-operable means for actuating said switch means to close said circuits, thermostat means in said second electrical circuit for actuating the switch means to open both circuits a predetermined time after the closing of the thermostat circuit, and switch means in said second circuit only, for opening and closing the same whereby the thermostat means is rendered inoperative when the circuit is open, said last-mentioned switch means being actuated by the steering mechanism of the automobile, said lamp circuit when closed remaining in operation until the circuit of the thermostat has been closed for a predetermined length of time.

3. In a device of the character described for controlling the operation of automobile signal lamps, a lamp circuit, a second electrical circuit, switch means for opening and closing both of said circuits, said switch means being arranged to act simultaneously in both circuits, manually-operable means for actuating said switch means to close said circuits, thermostat means in said second electrical circuit for actuating said switch means a predetermined time after the closing of the second circuit to open both circuits, switch means in the circuit of said thermostat only, for opening and closing the circuit independently of the lamp circuit whereby said thermostat means is rendered inoperative when the circuit thereof is open and is rendered operative by the closing thereof, and means associated with the steering mechanism of the automobile for controlling the operation of said last-mentioned switch means, said switch means being arranged to open the second electrical circuit when the wheels of the automobile are turned to either side and to close the same circuit when the wheels are returned to forwardly-aligned position.

DOUGLAS L. BUTOW.